United States Patent
Simoncelli

(10) Patent No.: US 9,852,027 B2
(45) Date of Patent: Dec. 26, 2017

(54) VIRTUAL MACHINE HIGH AVAILABILITY MANAGEMENT

(71) Applicant: Red Hat, Inc., Raleigh, NC (US)

(72) Inventor: Federico Simoncelli, Fano (IT)

(73) Assignee: Red Hat, Inc., Raleigh, NC (US)

( * ) Notice: Subject to any disclaimer, the term of this patent is extended or adjusted under 35 U.S.C. 154(b) by 79 days.

(21) Appl. No.: 14/452,719

(22) Filed: Aug. 6, 2014

(65) Prior Publication Data
US 2016/0041881 A1  Feb. 11, 2016

(51) Int. Cl.
*G06F 11/00* (2006.01)
*G06F 11/14* (2006.01)
*G06F 9/455* (2006.01)

(52) U.S. Cl.
CPC ...... *G06F 11/1438* (2013.01); *G06F 9/45558* (2013.01); *G06F 11/1484* (2013.01); *G06F 2009/45575* (2013.01)

(58) Field of Classification Search
CPC . G06F 11/141; G06F 11/1474; G06F 11/1438
See application file for complete search history.

(56) References Cited

U.S. PATENT DOCUMENTS

| | | | |
|---|---|---|---|
| 7,711,820 B2 | 5/2010 | Sharma et al. | |
| 8,286,174 B1 | 10/2012 | Schmidt et al. | |
| 8,296,267 B2 | 10/2012 | Cahill et al. | |
| 8,417,885 B2* | 4/2013 | Chou | G06F 11/1662 711/112 |
| 2009/0119664 A1* | 5/2009 | Pike | G06F 9/45558 718/1 |
| 2013/0185715 A1* | 7/2013 | Dunning | G06F 9/45558 718/1 |
| 2013/0254404 A1 | 9/2013 | Johnsen et al. | |
| 2015/0378857 A1* | 12/2015 | Sevigny | G06F 11/2094 714/6.3 |

FOREIGN PATENT DOCUMENTS

FR  2995425 A1  3/2014

OTHER PUBLICATIONS

Cully, Brendan et al., "Remus: High Availability Via Asynchronous Virtual Machine Replication", University of British Columbia, Department of Computer Science, pp. 1-26 https://www.usenix.org/legacy/event/nsdi08/tech/full_papers/cully/cully_html/ (Last accessed Aug. 12, 2014).

(Continued)

*Primary Examiner* — Matt Kim
*Assistant Examiner* — Katherine Lin
(74) *Attorney, Agent, or Firm* — Lowenstein Sandler LLP

(57) ABSTRACT

Systems and methods for virtual machine high availability management. An example method may comprise: identifying a virtual machine; receiving information pertaining to the virtual machine; initiating virtual machine availability management, wherein the availability management commences without virtual machine shutdown; detecting a failure of the virtual machine; and causing re-launch of the virtual machine using the received information.

17 Claims, 6 Drawing Sheets

(56) References Cited

OTHER PUBLICATIONS

Kassahun, Solomon Emirie, et al. "A PMIPv6 Approach to Maintain Network Connectivity during VM Live Migration over the Internet", School of Computing, Blekinge Institute of Technology, Sweden, Oct. 2013, 71 pages http://www.planarkitekterna.se/fou/cuppsats.nsf/all/73e0fa43c0f654e0c1257c0f00562015/$file/BTH2013Kassahun.pdf.

"Oracle VM High Availability: Hands-on Guide to Implementing Guest VM HA", Oracle Corporation, Oracle Technical White Paper, Apr. 2009, 18 pages http://www.oracle.com/us/technologies/026966.pdf.

"VMware High Availability: Concepts, Implementation, and Best Practices", VMware, Inc. 2007, 29 pages http://www.vmware.com/files/pdf/VMwareHA_twp.pdf.

\* cited by examiner

VIRTUAL MACHINE HIGH AVAILABILITY MANAGEMENT

TECHNICAL FIELD

This disclosure relates to the field of virtualization and, in particular, to the management of virtual machine high availability.

BACKGROUND

Within a virtualization environment, virtual machines (VMs) may be made available for use. Such a VM may experience failure due to reasons including hypervisor failure, host server failure, and reasons tied to neither hypervisor nor host server failure. Endeavoring to combat such failure-caused VM unavailability, the virtualization environment may offer high availability (HA) functionality which attempts to re-launch a failed VM.

However, known methods for making a VM highly-available require stopping and re-starting the VM for allowing a HA agent take control over the VM once the VM is restarted. Performing an operation that requires VM restart may be undesirable both during the VM deployment time (as it may interfere with the deployment) and after the VM deployment is complete.

BRIEF DESCRIPTION OF THE DRAWINGS

The present disclosure is illustrated by way of example, and not by way of limitation, in the figures of the accompanying drawings.

DETAILED DESCRIPTION

Within a virtualization environment, virtual machines (VMs) may be made available for use (e.g., in connection with application hosting, service hosting, and/or provision of virtual desktops). Such a VM may run upon a hypervisor of a host server. A VM may experience failure due to reasons including failure of a corresponding hypervisor and/or failure of a corresponding host server, and reasons not tied to hypervisor or host server failure (e.g., failure due to the rise of an error condition within an operating system running inside the VM). Endeavoring to combat such failure-caused VM unavailability, the virtualization environment may offer high availability (HA) functionality which attempts to re-launch a failed VM.

However, for a VM to begin enjoying such HA functionality, the VM is typically shut down. In order to emerge from this shut down state, the VM typically must be restarted. The call for such VM shutdown and then restart is regrettable for a number of reasons including not just the time lost in the shutdown and the time lost in the startup, but also the potential introduction into the VM's lifecycle of shut down-related and startup-related errors.

Set forth herein are example of approach by which HA functionality may be provided through the employ of discussed-herein HA daemons. Such an HA daemon may facilitate allowing a VM to offer high availability by, for instance, dispensing with call for that VM to be shut down in order for it to so offer.

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example-only details and still be contemplated to be within the scope of the present disclosure.

Figure 1:
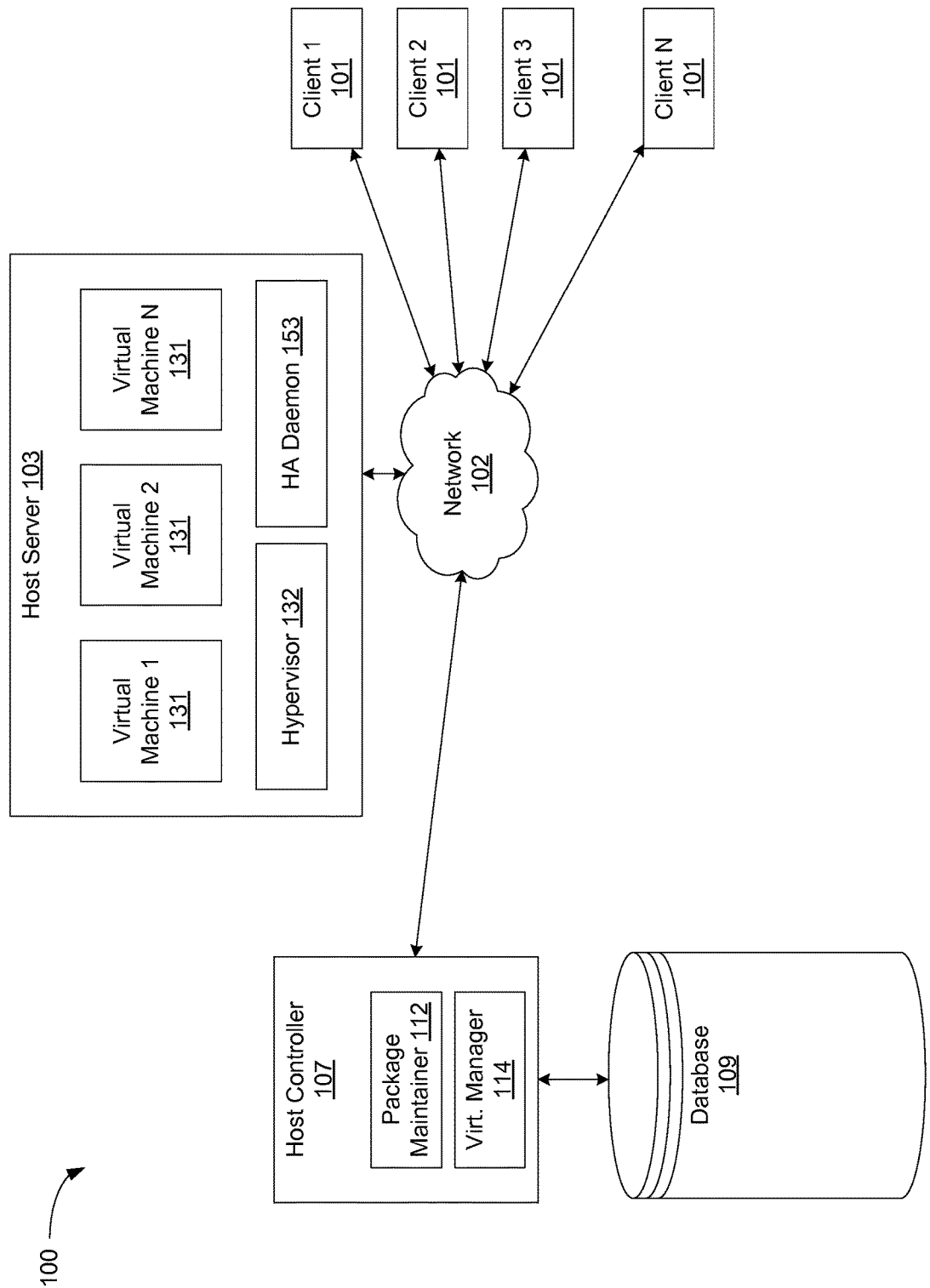
FIG. 1 illustrates an example network architecture in which examples of the present disclosure may operate.

FIG. 1 illustrates an example network architecture 100 in which examples of the present disclosure may operate. The network architecture 100 includes one or more host servers 103 coupled to clients 101 over a network 102. The network 102 may be a private network (e.g., a local area network (LAN), wide area network (WAN), intranet, etc.) or a public network (e.g., the Internet). The host servers 103 may also be coupled to a host controller 107 (via the same or a different network or directly). Host controller 107 may be an independent machine such as a server computer, a desktop computer, a virtual machine, etc. Alternatively, the host controller 107 may be part of the host servers 103. In one example, the network architecture 100, including host controller 107, host servers 103 and clients 101, may be referred to as a virtualization environment.

In one example, the clients 101 may include computing devices that have a wide range of processing capabilities. Some or all of the clients 101 may be thin clients, which serve as access terminals for users and depend primarily on the host servers 103 for processing activities. For example, the client 101 may be a desktop computer, laptop computer, cellular phone, personal digital assistant (PDA), etc. The client 101 may run client applications such as a Web browser. The client 101 may also run other client applications, which receive multimedia data streams or other data from the host server 103 and re-direct the received data to a local display or other user interface.

Host servers 103 may include server computers or any other computing devices capable of running one or more virtual machines 131. Each virtual machine 131 runs a guest operating system (OS) that may be different from one virtual machine to another. The guest OS may include Microsoft Windows, Linux, Solaris, OS X, etc. The host server 103 may include a hypervisor 132 that emulates the underlying hardware platform for the virtual machines 131. The hypervisor 132 may also be known as a virtual machine monitor (VMM) or a kernel-based hypervisor. As is discussed in greater detail herein below, hypervisor 132 may perform operations including providing indication of VM existence and/or of setup conclusion, collecting VM information, and dispatching VM information. As also discussed in greater detail herein below, hypervisor 132 may further perform operations including receiving VM launch requests, receiving VM information, performing VM acquisition, and performing VM re-launch.

The host server 103 may also include a high availability (HA) daemon 153. As is discussed in greater detail herein below, HA daemon 153 may perform operations including gaining VM awareness, receiving VM information, and performing VM availability management.

Each virtual machine 131 can be accessed by one or more of the clients 101 over the network 102 and can provide a virtual desktop for the client(s) 101. From the user's point of view, the virtual desktop functions as a physical desktop (e.g., a personal computer) and is indistinguishable from a physical desktop. Each virtual machine 131 may be linked to one or more virtual disks. These virtual disks can be logical partitions of a physical disk managed by hypervisor 132, can be cloud based storage devices, or can be some other type of virtual storage device. In one example, virtual disks may form a whole or part of a logical data center. In one example, virtual machines 131 and virtual disks, together with host servers 103, may be collectively referred to as entities in a virtual machine system.

The virtual machines 131 and virtual disks are managed by the host controller 107. Host controller 107 may manage the allocation of resources from host server 103 to virtual machines 131. In addition, host controller may monitor the status of virtual machines 131 as well as the progress of commands and processes being executed by virtual machines 131 and/or on virtual machines 131. The host controller 107 may include a virtualization manager 114 to perform management operations in the virtualization system, including for example allocating resources of host servers 103 to virtual machines 131, monitoring the status of virtual machines 131, monitoring the progress of commands and processes being executed by virtual machines 131, etc.

The host controller 107 may also maintain a management database 109 used by the virtualization manager 114 for the above management operations. In one example, host controller 107 also includes a package maintainer 112 to install, upgrade, or configure software packages on the host server 103 and/or on the host controller 107 in a consistent manner. For example, the package maintainer 112 may be used to install or upgrade the virtualization manager 114 on the host controller 107. As another example, the package maintainer 112 may be used to install packages on one or more host servers 103 during deployment thereof.

In certain implementations, host controller 107 may be executed by a virtual machine, e.g., VM 131 that is running under hypervisor 132. HA daemon 153 may be employed to perform high availability management of VM 131 thus providing the high availability of host controller 107.

Figure 2:
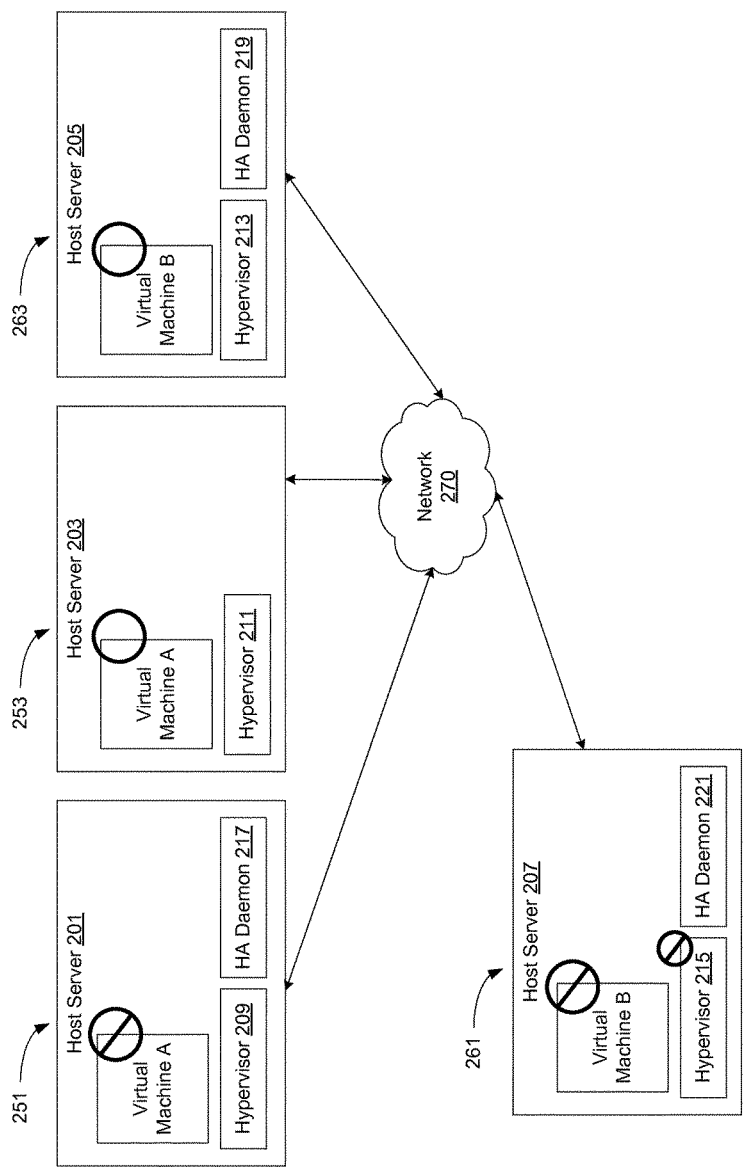
FIG. 2 illustrates a high availability (HA) architecture, according to an example.

FIG. 2 illustrates one example of a high availability (HA) architecture. Additional details regarding that which is discussed in connection with FIG. 2 is provided later herein. Shown in FIG. 2 are host servers 201-207 which may be connected to one another via network 270 (e.g., an Ethernet network) and which may form a host server cluster. Running on host servers 201-207 may, respectively, be hypervisors 209-215. Hypervisors 209-215 may belong to a hypervisor cluster. Running on host servers 201, 205, and 207 may, respectively, be high availability (HA) daemons 217, 219, and 221. The HA daemons may operate in a distributed fashion. It is noted that host server 203 lacks an HA daemon. As is discussed in greater detail below, host server 203 may nevertheless provide HA functionality to the hosted VMs (e.g., Virtual Machine A).

Illustrated in FIG. 2 is, in one aspect, a circumstance (251) where virtual machine A had been running upon hypervisor 209 of host server 201 but has failed while hypervisor 209 remained operational. Further illustrated in FIG. 2 is virtual machine A having been re-launched (253), due to the action of one or more of HA daemons 217-221, upon hypervisor 211 of host server 203. It is noted that, as hypervisor 209 remained operational, virtual machine A might, in the alternative, have been re-launched upon the same hypervisor 209 upon which the VM had previously run.

Illustrated in FIG. 2 is, in another aspect, a circumstance (261) where virtual machine B had been running upon hypervisor 215 of host server 207 but has failed within a situation where hypervisor 215 has failed. Also illustrated in FIG. 2 is virtual machine B having been re-launched (263), due to the action of one or more of HA daemons 217-221, upon hypervisor 213 of host server 205.

Figure 3:
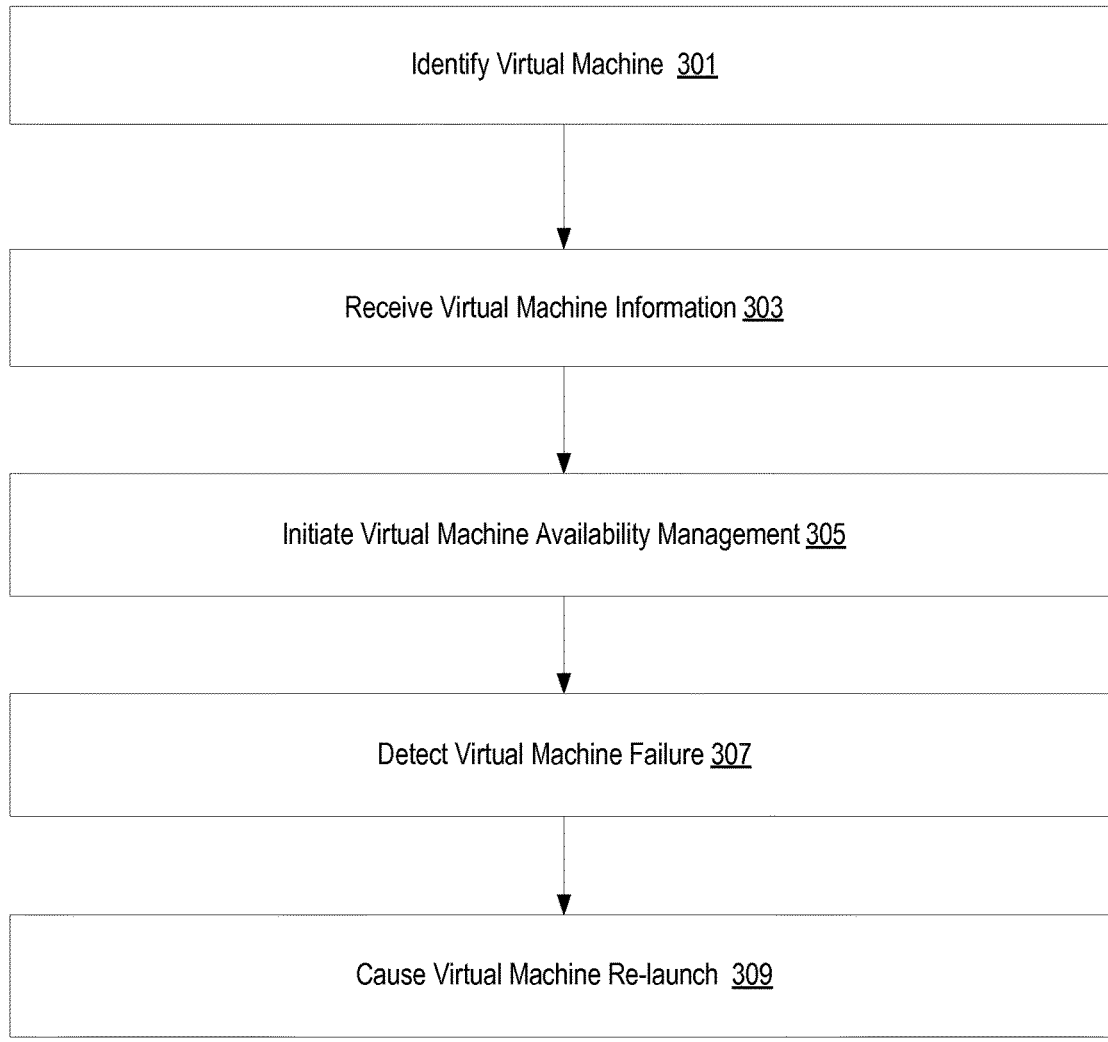
FIG. 3 is a flow diagram illustrating a method of performing virtual machine (VM) availability management, according to an example.

FIG. 3 illustrates a flow diagram of one example of a method of performing virtual machine (VM) availability management (e.g., preforming availability management with respect to a VM 131). The method may be performed by processing logic that comprises hardware (e.g., circuitry, dedicated logic, programmable logic, microcode, etc.), software (such as instructions run on a processing device), or a combination thereof. As one example, the method may be performed by a high availability (HA) daemon running on a computing device For instance, the method may be performed by HA daemon 153 running on host server 103. The processing logic may, as is discussed in greater detail herein below, operate in a distributed fashion.

Referring to FIG. 3, at block 301 the processing logic may identify a particular VM. In an illustrative example, the processing logic may receive an identifier of the VM (e.g., a Universally Unique Identifier (UUID)).

The VM of which the processing logic becomes aware may be one which is presently executing within a hypervisor. The VM of which the processing logic becomes aware may be one which is not presently executing within a hypervisor. Moreover, the VM of which the processing logic becomes aware may be one for which a setup operation has been completed. Also, the VM of which the processing logic becomes aware may be one for which a setup operation has not been completed (e.g., the VM may be still undergoing setup, or the VM may be one which is not subject to a setup operation). It is noted that having the processing logic become aware of a VM for which there has been the conclusion of a setup operation, or a of VM which is not subject to a setup operation may provide for, say, avoidance of the processing logic (e.g., in the management of HA daemon functionality) misinterpreting a VM disruption which is an intended setup operation stage (e.g., a disruption arising from an intended VM reboot of the setup operation) as one which calls for high availability (HA) action (e.g., action leading to re-launch of the VM).

The processing logic may become aware of the VM by virtue of accessing (e.g., via Network File System (NFS), Hypertext Transfer Protocol (HTTP), and/or Server Message Block (SMB)) a file, and/or by accessing (e.g., via Remote Database Access (RDA)) a database entry. The file or database entry may be one whose presence is indicative of the existence of the VM, and/or whose presence is indicative of setup having concluded with respect to the VM. The file or database entry may be one whose content indicates (e.g., via Extensible Markup Language (XML)) the existence of the VM, and/or whose content indicates (e.g., via XML) setup having concluded with respect to the VM. Where the presence of the file or database entry is indicative of setup having been completed, the file or database entry may be placed by the setup operation. Where the content of the file or database entry is indicative of setup having been completed, the setup operation may act to set the content of the file or database entry.

The processing logic may, for instance, access the file or database entry by directing its attention to a particular known location (e.g., a location set during a deployment operation). The processing logic may, for instance, first locate the file or database entry via a search operation, and then direct its attention to the location yielded by the search.

The processing logic may become aware of the VM by virtue of inter-process communication (e.g., via the employ of Simple Object Access Protocol (SOAP) and/or of eXtensible Markup Language-Remote Procedure Call (XML-RPC)) with a hypervisor associated with the VM. Via such inter-process communication the processing logic may receive indication of the existence of the VM, and/or indication that setup has been completed with respect to the VM. In line with that which is discussed hereinabove in connection with files and database entries, the presence of the hypervisor indication (e.g., that indication is received) or the content of the hypervisor indication may be indicative of VM existence and/or of VM setup conclusion.

The inter-process communication may involve the processing logic querying (e.g., periodically and/or according to a schedule) one or more hypervisors (e.g., one or more hypervisors associated with one or more clusters) and receiving corresponding replies from those hypervisors. The inter-process communication may involve the processing logic receiving notifications initiated by hypervisors (e.g., one or more hypervisors associated with one or more clusters) desirous of reporting VM existence and/or desirous of reporting conclusion of VM setup. The processing logic may be a subscriber to such hypervisor-initiated notifications (e.g., the processing logic may subscribe to those notifications issued by one or more hypervisors associated with one or more particular clusters), and/or might receive such a notification without having issued a particular query therefor.

The processing logic may, at block 303 receive (e.g., via inter-process communication) information regarding the VM. Such information may be received from the hypervisor associated with the VM. The information regarding the VM may include configuration information regarding the VM, state information regarding the VM, and/or a UUID of the VM. As an example, the information regarding the VM may include configuration information but not state information. So doing may serve to decrease network traffic relative to the inclusion of state information.

The state information regarding the VM may include the content of the VM's emulated random access memory (RAM), and/or the content of the VM's emulated program counter processor register and/or the content of other of the VM's emulated processor registers. The configuration information may include information concerning an emulated machine to which the VM is applied, information concerning access to one or more disk images of the VM, and/or information concerning binding of virtual network cards (vNICs) to host server network cards.

Such emulated machine information may include details regarding emulated processor(s) (e.g., processor type and/or quantity), details regarding emulated memory (e.g., RAM), details regarding emulated video, and/or details regarding emulated input/output devices (e.g., emulated Ethernet, emulated Fibre channel, and/or emulated Universal Serial Bus (USB))). Such disk image access information may include indication (e.g., specification of one or more paths) regarding the location or locations of one or more disk image files which correspond to the VM. Such vNIC-host server network card binding information may include information mapping vNICs to host server network cards (e.g., indication that a first vNIC is to be mapped to a first Ethernet card of the host server, and that a second vNIC is to be mapped to a binding together of a second Ethernet card and a third Ethernet card of the host server).

The processing logic may receive the information regarding the VM without having issued a particular request therefor. The hypervisor may—say periodically and/or according to a schedule—dispatch notifications providing VM information, and the processing logic may subscribe to these notifications. The information regarding the VM provided by the dispatch may include configuration information, state information, and/or VM UUID (e.g., the dispatch might include, in accordance with that which is indicated during a deployment operation, configuration information, state information, and/or VM UUID).

The processing logic may receive the information regarding the VM in response to a corresponding request. For example, the processing logic may, responsive to becoming aware of the VM, dispatch a request for such information regarding the VM. As such, the processing logic may employ inter-process communication in dispatching such a request to the hypervisor associated with the VM The processing logic may include in the request indication as to the specificities of the desired information. For instance, the processing logic may indicate that configuration information regarding the VM is desired, that state information regarding the VM is desired, and/or the VM UUID is desired. Alternately, the processing logic might not include such indication in the request. Where the processing logic does not include such indication, the hypervisor recipient of the request may respond with such configuration information, such state information, and/or such VM UUID (e.g., the request recipient might provide, in accordance with that which is indicated during a deployment operation, configuration information, state information, and/or VM UUID).

Being in receipt of the VM information the processing logic may store (e.g., in an array or via a database entry) the VM information in a fashion which associates a received UUID of the VM information with other of the VM information (e.g., in a fashion which associates such UUID with configuration information and/or with state information).

As an example, the VM information received (e.g., via a notification to which the processing logic has subscribed) by the processing logic (e.g., from a hypervisor associated with the VM) may include VM UUID but neither configuration information nor state information. Such may serve to decrease network traffic. Where such transpires, the processing logic may check whether or not it possesses VM information (e.g., configuration information) associated with the UUID (e.g., the processing logic may check a store—say an array—of the sort discussed). Where the processing logic finds that it possesses VM information associated with the UUID (e.g., configuration information) the processing logic may employ the possessed VM information. Where the processing logic finds that it does not possess such VM information the processing logic may lodge (e.g., via inter-process communication) a request for such VM information (e.g., a request directed towards a hypervisor associated with the VM).

At block 305 the processing logic may initiate availability management of the VM. The availability management of the VM by the processing logic may include the processing logic acting so that the VM remains available (e.g., highly available) for use (e.g., by users desiring to log onto the VM). The processing logic managing VM availability may act to detect failure of the VM and to instigate re-launch of the VM when failure occurs. In an illustrative example, the VM may be re-launched upon a hypervisor which had been running the VM prior VM failure. Alternatively, the VM may be re-launched upon a hypervisor different than one which had been running the VM prior VM failure. It is noted that the processing logic may commence availability management of the VM without necessitating a shutdown of the VM. Such VM shutdown avoidance may, for example, be facilitated by the processing logic receiving the VM information from a hypervisor associated with the VM (e.g., as opposed to the processing logic having come to have learned of the VM information via a shutdown of the VM followed by inspection of the VM). It is further noted that the processing logic may commence availability management of the VM at a point in time at which the VM is not undergoing setup. For instance, as discussed hereinabove in connection with the processing logic having learned of the VM, the learned-of VM may be one for which a setup operation has concluded, or the VM may be one which is not subject to a setup operation.

In acting to detect failure of the VM, the processing logic may query (e.g., periodically and/or according to a schedule) the hypervisor associated with the VM. The processing logic may employ inter-process communication in such queries. The hypervisor may be aware of whether or not its VMs running or whether those VMs have failed. The hypervisor, when receiving the query, may take into account such knowledge of its VMs and respond accordingly (e.g., via inter-process communication) with an indication of either that the at-hand VM is running or that the at-hand VM is not running.

The processing logic may consider the VM to have failed where the response from the hypervisor indicates such. Such hypervisor response may correspond to a circumstance where the VM has failed but the hypervisor remains operational. The processing logic may consider the VM to have failed in the case where it receives no response to the query. The rationale for such functionality might be viewed as being that lack of response to the query is taken to be indicative of failure of the hypervisor (e.g., due to failure of a host server upon which the hypervisor runs or failure of the hypervisor apart from failure of the host server upon which it runs), and that hypervisor failure leads to the failure of those VMs under its thrall. The processing logic may act such that, in the case of no response, the processing logic resends the query. The processing logic may act such that a certain quantity (e.g., set during a deployment operation) of unanswered queries are to occur in order for the VM to be considered to have failed (e.g., at least three queries might need to be dispatched and go unanswered in order for VM failure to be declared). Such functionality may act to compensate for queries not received by the hypervisor and/or responses not received by the processing logic which arise due to networking congestion or temporary outage.

In acting to detect failure of the VM, the processing logic may receive, from the hypervisor associated with the VM, notifications which are sent (e.g., via inter-process communication) periodically and/or in accordance with a schedule by the hypervisor rather than in response to particular requests therefor by the processing logic. The processing logic may subscribe to these notifications. As noted, the hypervisor may be aware of whether or not its VMs running or whether those VMs have failed. The hypervisor may leverage such knowledge in connection with its periodic and/or scheduled reports. The hypervisor may, in such a report, indicate either that the at-hand VM is running or that the at-hand VM is not running.

In that vein of that which is discussed hereinabove, the processing logic may consider the VM to have failed where the periodic and/or scheduled report from the hypervisor indicates such, and may consider the VM to have failed in the case where the periodicity and/or scheduling of reports indicates that a report is to be received, but no report is received. In the vein of the above, the rationale for such functionality might be viewed as being that lack of a report at an expected time is taken to be indicative of failure of the hypervisor and, consequently, failure of the VM. The processing logic may act such that a certain quantity (e.g., set during a deployment operation) of lack of expected reports are to transpire in order for the VM to be considered to have failed (e.g., at least three expected reports would need to be not received in order for VM failure to be declared). Such functionality may act to compensate for reports which do not arrive as a result of, say, networking congestion or temporary outage.

Alternately or additionally, the processing logic may act to detect failure of the VM in a fashion analogous to that described in connection with sending queries to and/or receiving periodic and/or scheduled reports from the hypervisor, but with respect to code (e.g., a daemon) which runs within the VM (e.g., code which within an operating system employed by the VM). Such code may, by virtue of running within the VM, be privy at least to the circumstance of lack of VM failure.

It is noted that such within-VM code may, while the VM is operating, be capable of responding to queries and/or capable of sending periodic and/or scheduled reports, but might be incapable of sending such responses and/or such reports where the VM has failed. Where such circumstance holds, the processing logic may act in a fashion largely analogous that that discussed above in connection with sending queries to and/or receiving periodic and/or scheduled reports from the hypervisor, but without the arm of receiving explicit indication of VM failure. As such, the processing logic might, in line with that which has been described, consider the VM to be operating where it receives reply, or periodic and/or scheduled report, indicating such, and consider the VM to be not operating in the case of unanswered query and/or lack of expected periodic and/or scheduled report.

As just discussed, the processing logic may come to be aware of VM failure in a number of ways (e.g., in connection with an unanswered query, or in connection with the absence of an expected periodic and/or scheduled report). According to the example of FIG. 3, at block 307 the processing logic has thusly detected such VM failure.

As noted in connection with block 305, availability management of the VM by the processing logic may include the processing logic instigating re-launch of the VM. Such re-launch functionality will now be discussed in connection with block 309 where, according to the example of FIG. 3, the processing logic instigates re-launch of a failed VM.

Instigating re-launch of the VM may involve the processing logic determining a hypervisor upon which to re-launch the VM. In so determining, the processing logic may take into account hypervisor operational status.

In acting to determine hypervisor operational status, the processing logic may query one or more hypervisors (e.g., one or more hypervisors associated with one or more clusters). Such queried hypervisors may include the hypervisor which had been running the at-hand VM prior to that VM's failure. The processing logic may employ inter-process communication in such queries. A functional hypervisor receiving the query may respond (e.g., via inter-process communication) in a fashion which indicates that the hypervisor is functional. For Instance the content of the response may specify that the hypervisor is functional or the presence of a response may be indicate that the hypervisor is functional. Where such a query is dispatched to a non-functional hypervisor, the hypervisor may be unable to receive and/or respond to the query. As such, the processing logic may consider a lack of response to from a queried hypervisor to be indication that such hypervisor is non-functional. In line with that which is discussed hereinabove, the processing logic may act such that a certain quantity of unanswered queries are to occur in order for the hypervisor to be considered to be non-functional.

In acting to determine hypervisor operational status, the processing logic may receive from one or more hypervisors (e.g., one or more hypervisors associated with one or more clusters) notifications which are sent (e.g., via inter-process communication) periodically, and/or in accordance with a schedule, by those hypervisors rather than in response to particular requests therefor by the processing logic. The processing logic may subscribe to these notifications. A functional hypervisor may send (e.g., according to a periodicity and/or to a schedule) reports which convey that the hypervisor is functional. For instance, the content of the report may specify that the hypervisor is functional or the issuance of a report may be indicate that the hypervisor is functional. A non-functional hypervisor may be unable to formulate reports. As such, the processing logic may consider a hypervisor to be non-functional where the periodicity and/or scheduling of reports indicates that a report is to be received but no report is received. In line with that which is discussed hereinabove, the processing logic may act such that a certain quantity of lack of expected reports are to transpire in order for the hypervisor to be considered to be non-functional.

As such, via the files, database entries, query responses, and/or received reports the processing logic may become aware of one or more functional hypervisors (e.g., one or more hypervisors associated with one or more particular clusters). The processing logic may choose from among these functional hypervisors a hypervisor upon which to re-launch the VM. Where the processing logic becomes aware of no functional hypervisors (e.g., where the processing logic receives no responses and/or reports indicative of functional hypervisors), the processing logic may log an error (e.g., to a console).

In selecting from functional hypervisors a hypervisor upon which to re-launch the VM, the processing logic may employ random selection, employ round-robin selection, take into account hypervisor load, and/or select the hypervisor which had been running the at-hand VM prior to VM crash in that case where that hypervisor is functional.

Having selected a hypervisor upon which to re-launch the VM, the processing logic may send to the selected hypervisor (e.g., via inter-process communication) a request to launch the VM and/or information regarding the VM. The information regarding the VM may include some or all of the configuration information regarding the VM, the state information regarding the VM, and/or the UUID of the VM.

Where the selected hypervisor is the hypervisor which had been running the at-hand VM prior to VM crash, the hypervisor may already possess the information regarding the VM. As such, where the selected hypervisor is the hypervisor which had been running the at-hand VM prior to VM crash the processing logic may send to the hypervisor a request to launch the VM but not send information regarding the VM. Where the selected hypervisor is other than the hypervisor which had been running the at-hand VM prior to VM crash, the processing logic may send information regarding the VM but not send a request to launch the VM (e.g., the VM information dispatch may serve as indication that VM launch should be performed). Moreover, as an example the processing might send to the selected hypervisor configuration information regarding the VM but not state information regarding the VM. So doing may serve to decrease network traffic relative to the inclusion of state information. As another example the processing logic may send to the selected hypervisor VM UUID but neither configuration information nor state information. Such may serve to decrease network traffic.

Under the circumstance of a failure of the processing logic, the processing logic may experience re-launch (e.g., via the action of a daemon launcher). The processing logic may then return to block 301 so as to perform once again some or all of the operations discussed hereinabove in connection with FIG. 3. It is noted that such failure of the processing logic may result in stoppage of the availability management.

In once again performing some or all of the operations discussed hereinabove in connection with FIG. 3, the processing logic may be open to performing availability management with respect to a different VM than the one which it had been managing prior to the failure. As such, the processing logic might via, performance of some or all of the operations discussed hereinabove in connection with FIG. 3, find itself managing either the same VM as prior to the failure, or find itself managing a different VM than prior to the failure.

In once again performing some or all of the operations discussed hereinabove in connection with FIG. 3, the processing logic may only be open to performing availability management with respect to the same VM that it had been managing prior to the failure. The processing logic may, across re-launch, retain knowledge of the identity (e.g., as specified by a corresponding UUID) of the VM which it had been managing prior to the failure (e.g., such an identity might be stored in a storage location which persists across the failure). The processing logic may then, when performing operations in line with those discussed hereinabove in connection with block 301, be only satisfied by gaining awareness of the VM (e.g., as specified by UUID) which has been its thrall prior to the failure. For instance, the processing logic might become aware of one or more VMs having identities other than the one which had been the processing logic's thrall prior to the failure, but ignore these VMs and await becoming aware of the VM which had been its thrall prior to the failure. It is noted that the processing logic may recommence availability management of the VM which had been its thrall without there being a shutdown of that VM. It is noted that the processing logic may, after a certain amount of time has passed (e.g., a period of time set during a deployment operation) make itself open to VMs other than one which has been its thrall prior to the failure.

As an illustration of failure of the processing logic, the processing logic may, via operations in line with those discussed hereinabove in connection with blocks 301-305, regain awareness of the VM for which it had performed availability management prior to the failure, re-receive the information regarding that VM, and resume performance of availability management with respect to that VM.

As referenced hereinabove, the processing logic (e.g., acting as an HA daemon) may operate in a distributed fashion. Such distributed processing logic may run on one or more computing devices (e.g., on one or more host servers). The computing devices (e.g., host servers) may belong to a group (e.g., a cluster). The distributed operation may involve some or all of the functionality discussed hereinabove in connection with FIG. 3 being split among multiple instances of the processing logic (e.g., among multiple HA daemons) and/or being performed cooperatively by the multiple instances of the processing logic (e.g., multiple HA daemons). The distributed operation may involve communication (e.g., inter-process communication) among the multiple instances of the processing logic (e.g., multiple HA daemons).

Where operation is distributed, an instance of the processing logic (e.g., an HA daemon) may run on each of a certain group of computing devices (e.g., on each of the computing devices—say host servers—of a cluster). Alternatively, where operation is distributed an instance of the processing logic may run on only certain of the computing devices of a computing device group (e.g., on only certain of the computing devices—say host servers—of a cluster). Where a processing logic instance (e.g., an HA daemon) runs on only such certain computing devices, those processing logic instances (e.g., HA daemons) may perform, in a split and/or cooperative fashion, the operations discussed herein in connection with FIG. 3 such that computing devices which lack an instance of the processing logic (e.g., lack an HA daemon) nevertheless enjoy the functionality discussed herein in connection with FIG. 3 (e.g., the computing devices possessing instances of the processing logic may act on behalf of the computing devices lacking instances of the processing logic). As such for instance, under a circumstance of a cluster of host servers in which certain of the host servers run instances of the processing logic (e.g., HA daemons) while others of the host servers do not, both those host servers running the processing logic instances (e.g., HA daemons) and those host servers which do not run the processing logic instances (e.g., HA daemons) may enjoy high availability (HA) functionality (e.g., high availability (HA) functionality with respect to VMs running upon hypervisors thereof).

Figure 4:
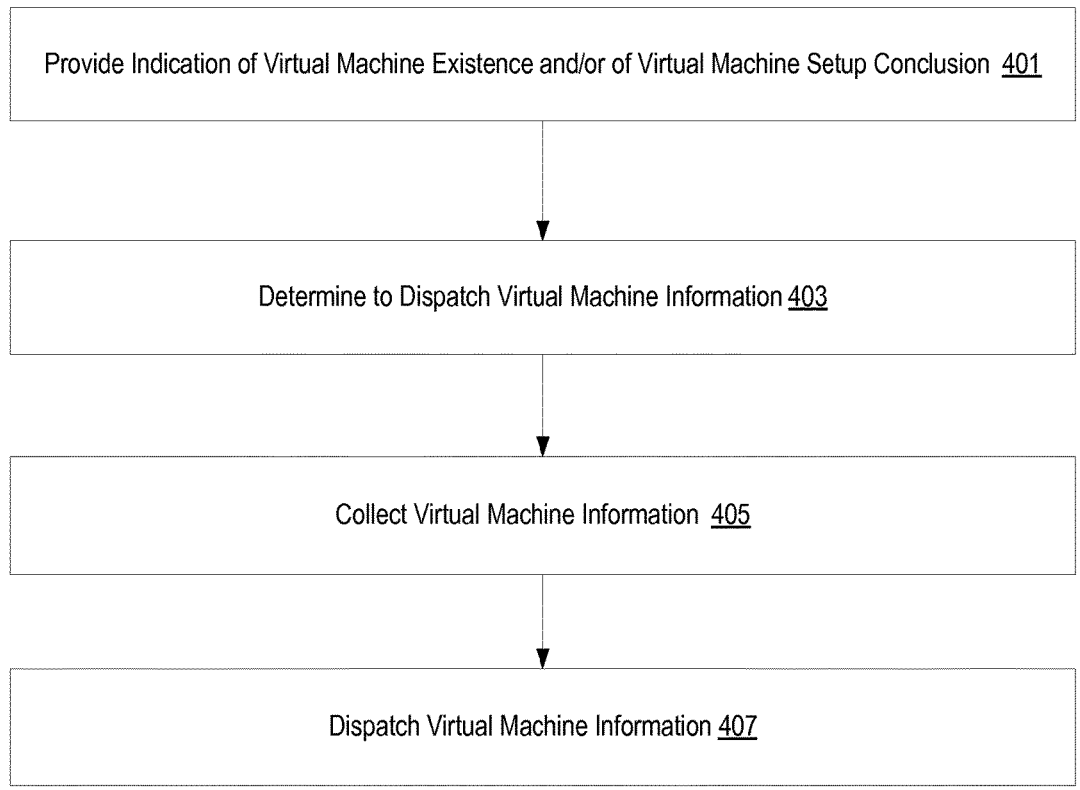
FIG. 4 is a flow diagram illustrating a method of providing indication of VM existence and/or of setup conclusion, and of providing VM information, according to an example.

FIG. 4 illustrates a flow diagram of one example of a method of providing indication of VM existence and/or indication of VM setup conclusion (e.g., with respect to a VM 131), and of providing VM information (e.g., concerning a VM 131). The method may be performed by processing logic that comprises hardware (e.g., circuitry, dedicated logic, programmable logic, microcode, etc.), software (such as instructions run on a processing device), or a combination thereof. As one example, the method may be performed by a hypervisor running on a computing device. For instance, the method may be performed by hypervisor 132 running on host server 103. The hypervisor may belong to a hypervisor cluster.

Referring to FIG. 4, at block 401 the processing logic may provide (e.g., via inter-process communication) indication of the existence of a VM associated with the processing logic, and/or indication that setup has concluded with respect to that VM. In line with that which is discussed hereinabove in connection with FIG. 3, the presence of the indication (e.g., that the processing logic provides the indication) or the content of the indication may be indicative of the VM existence and/or of the VM setup conclusion.

In providing the indication the processing logic may, via inter-process communication, receive (e.g., periodically and/or according to a schedule) queries from one or more HA daemons and may provide corresponding replies to those HA daemons. In providing, via inter-process communication, the indications the processing logic may initiate sending of such a notification when desirous of reporting VM existence and/or desirous of reporting conclusion of VM setup. The HA daemons may be subscribers to these processing logic-initiated notifications As an example, the processing logic may be thusly desirous under the circumstance of the processing logic newly coming to provide hypervisor functionality for that VM, and/or the processing logic learning (e.g., via receipt of inter-process communication sent by setup logic and/or via access of a file or database entry placed by setup logic) of conclusion of setup of that VM. The processing logic may send such a processing logic-initiated notification without having received a particular HA daemon query therefor.

It is noted that where the existence of the VM and/or setup conclusion for the VM is given (e.g., by action of a setup operation) via a file and/or via a database entry and where the HA daemons have access to such files and/or database entries, there might not be performance of block 401.

The processing logic may, at block 403, determine to dispatch (e.g., via inter-process communication) information regarding the VM. The information regarding the VM may include configuration information regarding the VM, state information regarding the VM, and/or a UUID of the VM. As an example, the information regarding the VM may include configuration information but not state information. So doing may serve to decrease network traffic relative to the inclusion of state information. As another example, the VM information may include VM UUID but neither configuration information nor state information. Such may serve to decrease network traffic.

The processing logic may dispatch VM information without receipt of a particular request therefor. The processing logic may (e.g., periodically and/or according to a schedule) dispatch notifications providing VM information and HA daemons may subscribe to these notifications. As such, the processing logic may determine to dispatch VM information when such is called for in order to meet its subscription obligations (e.g., the processing logic may determine to dispatch VM information when such is called for by a periodic and/or scheduled dispatch. The processing logic may provide VM information in response to received HA daemon requests. As such, the processing logic may, when in receipt of a HA daemon request, determine to dispatch VM information.

At block 405 the processing logic may collect the VM information which will be dispatched (e.g., VM UUID, configuration information, and/or state information). Where the VM information dispatch is in response to a received HA daemon request and the request includes specificities of the VM information which is desired (e.g., indication that either or both of configuration information and state information is desired), the processing logic may collect, as appropriate to meet the request, configuration information and/or state information. Where the VM information dispatch is in response to a received HA daemon request but the request does not includes specificities of the VM information which is desired—and likewise where the VM information dispatch is of the noted sort where HA daemons subscribe to notifications—the processing logic may collect configuration information, state information, and/or VM UUID (e.g., the processing logic might collect, in accordance with that which is indicated during a deployment operation, configuration information, state information, and/or VM UUID).

In collecting the state information the processing logic may collect information including the content of the at-hand VM's emulated RAM, and/or the content of the at-hand VM's emulated program counter processor register and/or the content of other of the at-hand VM's emulated processor registers. In collecting the state information the processing logic may interact with hypervisor functionality being provided to the at-hand VM (e.g., with hypervisor functionality of the processing logic). Collecting the RAM content may involve the processing logic interacting with emulated RAM provided by the hypervisor functionality. Collecting the register content (e.g., program counter register content) may involve the processing logic interacting with emulated processor registers provided by the hypervisor functionality. In collecting the configuration information the processing logic may collect information including the above discussed emulated machine information, disk image access information, and/or vNIC-host server network card binding information. In collecting such information the processing logic may interact with hypervisor functionality being provided to the at-hand VM (e.g., with hypervisor functionality provided by the processing logic) and/or may access one or more configuration files and/or database entries corresponding to the at-hand VM. In collecting the UUID the processing logic may interact with hypervisor functionality being provided to the at-hand VM and/or may access one or more configuration files and/or database entries corresponding to the at-hand VM.

The processing logic may, at block 407, dispatch (e.g., via inter-process communication) the collected VM information. As such, where the VM information is dispatched via notifications to which HA daemons subscribe, the processing logic may send such a notification (e.g., in accordance with a periodicity and/or with a schedule). Where the VM information is dispatched via responses to received HA daemon requests, the processing logic may send such a response.

Figure 5:
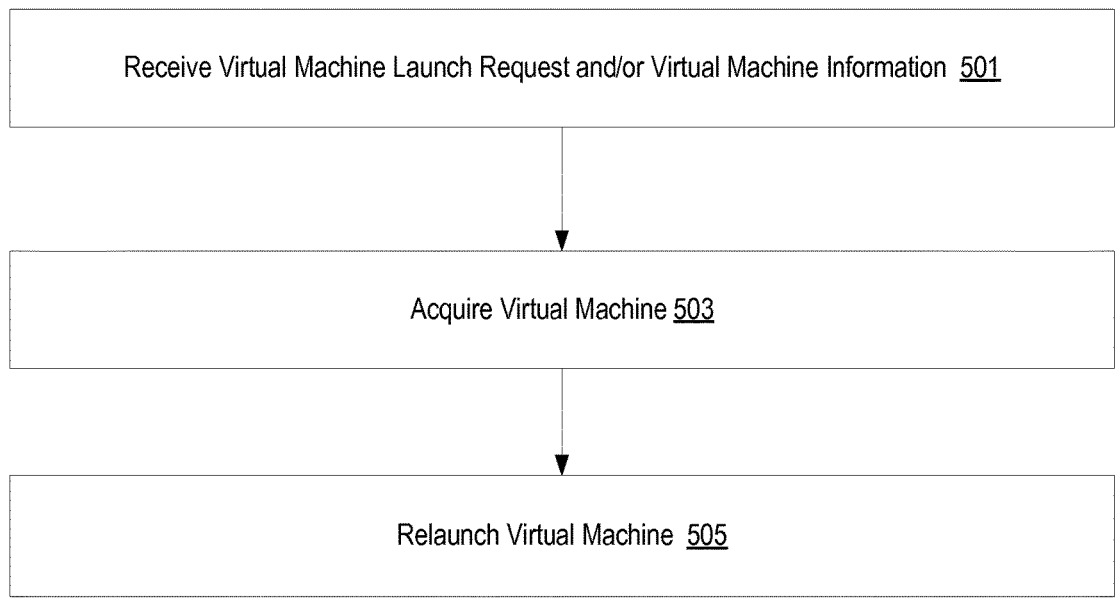
FIG. 5 is a flow diagram illustrating a method of performing VM re-launch, according to an example.

FIG. 5 illustrates a flow diagram of one example of a method of performing VM re-launch (e.g., re-launching a VM 131). The method may be performed by processing logic that comprises hardware (e.g., circuitry, dedicated logic, programmable logic, microcode, etc.), software (such as instructions run on a processing device), or a combination thereof. As one example, the method may be performed by a hypervisor running on a computing device. For instance, the method may be performed by hypervisor 132 running on host server 103. The hypervisor may belong to a hypervisor cluster.

Referring to FIG. 5, at block 501 the processing logic receives, from an HA daemon (e.g., via inter-process communication), a request to launch a VM, and/or receives from an HA daemon information regarding a VM. The information regarding the VM may include some or all of the configuration information regarding the VM, the state information regarding the VM, and/or VM UUID.

Where hypervisor functionality provided by the processing logic had been running the at-hand VM prior to VM failure, the processing logic may receive from the HA daemon a request to launch the VM but not information regarding the VM. Where the VM, prior to its crash, had been running upon hypervisor functionality other than hypervisor functionality provided by the processing logic, the processing logic may receive from the HA daemon information regarding the VM but not a request to launch the VM (e.g., the VM information dispatch may serve as indication that VM launch should be performed). It is noted that the processing logic may receive configuration information regarding the VM but not state information regarding the VM. So doing may serve to decrease network traffic relative to the inclusion of state information. It is further noted that the processing logic may receive VM UUID but neither configuration information nor state information. Such may serve to decrease network traffic.

At block 503 the processing logic may acquire the VM which is to be re-launched. Where the processing logic receives configuration information regarding the VM, such configuration information may include emulated machine information (e.g., details regarding emulated processor(s) and/or details regarding emulated memory), disk image access information (e.g., a path employable in accessing a disk image of the VM), and/or vNIC-host server network card binding information. As such, acquiring of the VM which is to be re-launched may involve the processing logic employing the configuration information in configuring an emulated machine which will be provided to the VM. The processing logic may configure the emulated machine so as to possess traits matching received emulated machine information (e.g., to possess an emulated processor specified thereby and/or to possess a quantity of emulated memory specified thereby), to employ a disk image specified by received disk image access information (e.g., to employ the disk image to which a specified path leads), and/or to apply received vNIC-host server network card binding information (e.g., to apply vNIC to host server network card mappings provided thereby).

Where the processing logic receives state information regarding the VM such state information may include emulated memory contents and/or emulated processor register contents (e.g., program counter register content). As such, acquiring the VM which is to be re-launched may involve the processing logic causing hypervisor functionality which is to be provided to the VM (e.g., hypervisor functionality to be provided by the processing logic to the VM) to adopt, with respect to the VM, a machine state consistent with the received state information (e.g., to adopt specified memory contents and/or register contents).

Having acquired the VM the processing logic may, at block 505, act to re-launch the VM. As such the processing logic may cause hypervisor functionality which is to be provided to the VM (e.g., hypervisor functionality to be provided by the processing logic to the VM) to start execution of the VM. The hypervisor functionality may, in response, execute the VM in a manner consistent with the above-discussed performed by the processing logic in connection with VM configuration information and/or the above-discussed performed by the processing logic in connection with VM state information.

So as to facilitate discussion, high availability (HA) functionality has been discussed herein in connection with VMs. However, HA functionality discussed herein may be applied in other ways. For example, the HA functionality discussed herein may be employed in connection with databases (e.g., databases to which clustering is applied) such that operations are performed in a manner analogous to that discussed herein but with database operational processes and/or threads in the role of the discussed VMs, and with database-related information—say database access information (e.g., path information), specification of quantity of employed threads, and/or state information (e.g., regarding read, write, and/or computational operations being executed by database operational processes and/or threads)—in the role of the discussed VM information.

As another example, the HA functionality discussed herein may be employed in connection with Hypertext Transfer Protocol (HTTP) operations (e.g., HTTP operations to which clustering is applied)—say HTTP operations regarding webpage serving and/or web application provision—such that operations are performed in a manner analogous to that discussed herein but with HTTP operational processes and/or threads in the role of the discussed VMs, and with HTTP-related information—say file (e.g., webpage file and/or web application file) access information (e.g., path), employed network port or ports, and/or state information (e.g., regarding read, write and/or computational operations being executed by HTTP operational processes and/or threads)—in the role of the discussed VM information.

Figure 6:
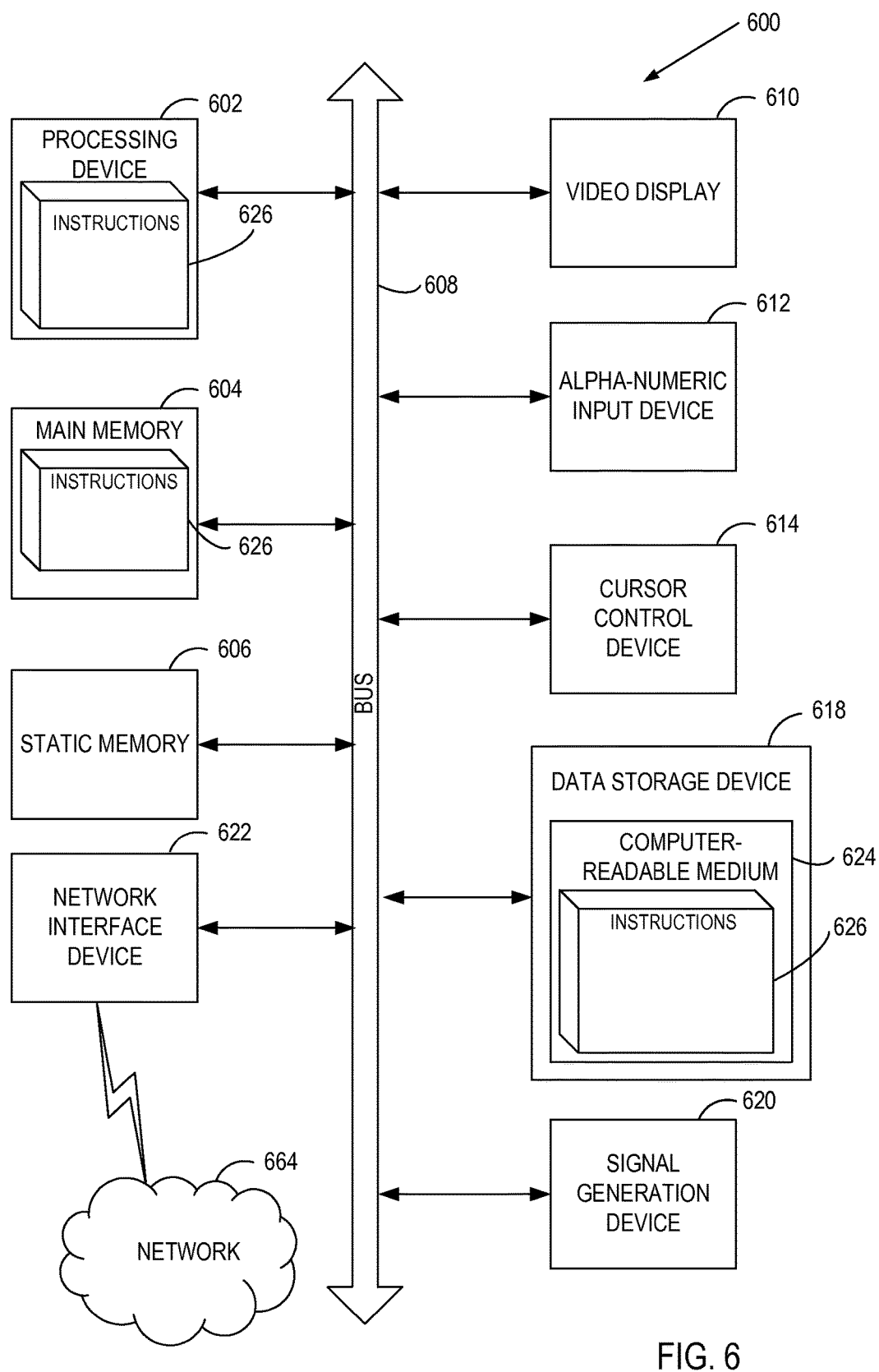
FIG. 6 is a diagrammatic representation of an example computer system which may execute one or more methods described herein.

FIG. 6 illustrates a diagrammatic representation of an example computing device 600 within which a set of instructions, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory (e.g., a data storage device 618), which communicate with each other via a bus 608.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 626) for performing the operations and steps discussed herein.

The computing device 600 may further include a network interface device 622. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a machine-readable storage medium (or more specifically a computer-readable storage medium) 624 on which is stored one or more sets of instructions 626 embodying any one or more of the methodologies or functions described herein. The instructions 626 may also reside, completely or at least partially, within the main memory 604, within the static memory 606 and/or within the processing device 602 during execution thereof by the computer system 600, the main memory 604, static memory 606 and the processing device 602 also constituting computer-readable storage media.

While the computer-readable storage medium 624 is shown in an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
   identifying, by a processing device, a virtual machine;
   receiving information pertaining to the virtual machine, wherein the information includes an indication of a setup operation completion with respect to the virtual machine;
   initiating, by the processing device, while the virtual machine is in a running state, availability management of the virtual machine;
   detecting a failure of a first hypervisor managing the virtual machine;
   selecting a second hypervisor by querying a plurality of hypervisors associated with a cluster comprising the first hypervisor; and
   causing the second hypervisor to re-launch the virtual machine using the received information.

2. The method of claim 1, wherein identifying the virtual machine comprises one or more of performing file access, performing database entry access, or performing hypervisor communication.

3. The method of claim 1, wherein the information pertaining to the virtual machine comprises at least one of: configuration information or state information.

4. The method of claim 1, further comprising:
detecting a re-launch of the virtual machine;
receiving updated information pertaining to the virtual machine; and
resuming performance of virtual machine availability management.

5. A system, comprising:
a memory; and
a processing device, operatively coupled to the memory, to:
identify a virtual machine;
receive information pertaining to the virtual machine, wherein the information comprises contents of emulated processor registers associated with the virtual machine and further comprises an indication of a setup operation completion with respect to the virtual machine;
initiate, while the virtual machine is in a running state, availability management of the virtual machine;
detect a failure of a first hypervisor managing the virtual machine; and
cause a second hypervisor to re-launch the virtual machine using the received information.

6. The system of claim 5, wherein identifying the virtual machine comprises one or more of performing file access, performing database entry access, or performing hypervisor communication.

7. The system of claim 5, wherein the processing device is further to:
select the second hypervisor by querying a plurality of hypervisors associated with a cluster.

8. The system of claim 5, wherein the information pertaining to the virtual machine comprises at least one of: configuration information or state information.

9. The system of claim 5, wherein the processing device is further to:
detect a re-launch of the virtual machine;
receive updated information pertaining to the virtual machine; and
resume performance of virtual machine availability management.

10. A non-transitory computer-readable storage medium comprising executable instructions that, when executed by a processing device, cause the processing device to:
identify, by the processing device, a virtual machine;
receive information pertaining to the virtual machine, wherein the information identifies a binding of a virtual network interface card associated with the virtual machine to a network interface card of a host server and further includes an indication of a setup operation completion with respect to the virtual machine;
initiate, by the processing device, while the virtual machine is in a running state, availability management of the virtual machine;
detect a failure of a first hypervisor managing the virtual machine; and
cause a second hypervisor to re-launch the virtual machine using the received information.

11. The non-transitory computer-readable storage medium of claim 10, wherein executable instructions causing the processing device to identify the virtual machine further comprise executable instructions causing the processing device to perform one or more of file access, database entry access, or hypervisor communication.

12. The non-transitory computer-readable storage medium of claim 10, further comprising executable instructions causing the processing device to:
select the second hypervisor by querying a plurality of hypervisors associated with a cluster.

13. The non-transitory computer-readable storage medium of claim 10, wherein the information pertaining to the virtual machine comprises at least one of: configuration information or state information.

14. The method of claim 1, wherein the information pertaining to the virtual machine identifies a location of a disk image file associated with a virtual machine.

15. The method of claim 1, wherein the information pertaining to the virtual machine includes contents of emulated random access memory associated with the virtual machine.

16. The method of claim 1, wherein causing the second hypervisor to re-launch the virtual machine further comprises selecting the second hypervisor by a round-robin rule.

17. The method of claim 1, wherein causing the second hypervisor to re-launch the virtual machine further comprises selecting the second hypervisor in view of a processing load of the second hypervisor.

* * * * *